United States Patent
Crockatt

(10) Patent No.: US 12,528,758 B2
(45) Date of Patent: Jan. 20, 2026

(54) PRODUCTION OF AROMATIC ACIDS AND PHENOLICS

(71) Applicant: Nederlandse Organisatie voor toegepast-natuurwetenschappelijk onderzoek TNO, s-Gravenhage (NL)

(72) Inventor: Marc Crockatt, 's-Hertogenbosch (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 961 days.

(21) Appl. No.: 17/766,615

(22) PCT Filed: Oct. 22, 2020

(86) PCT No.: PCT/NL2020/050654
§ 371 (c)(1),
(2) Date: Apr. 5, 2022

(87) PCT Pub. No.: WO2021/080426
PCT Pub. Date: Apr. 29, 2021

(65) Prior Publication Data
US 2024/0067593 A1    Feb. 29, 2024

(30) Foreign Application Priority Data
Oct. 22, 2019  (EP) .................................... 19204640

(51) Int. Cl.
*C07C 51/265*    (2006.01)
*C07C 37/055*    (2006.01)

(52) U.S. Cl.
CPC ........ *C07C 51/265* (2013.01); *C07C 37/0555* (2013.01)

(58) Field of Classification Search
None
See application file for complete search history.

(56) References Cited

FOREIGN PATENT DOCUMENTS

WO    2016114668 A1    7/2016

OTHER PUBLICATIONS

Moreno, Andres, et al. "An Efficient One-Pot Synthesis of Phenol Derivatives by Ring Opening and Rearrangement of Diels-Alder Cycloadducts of Substituted Furans Using Heterogeneous Catalysis and Microwave Irradiation," Synlett 2004, No. 7, pp. 1259-1263 (2004).

*Primary Examiner* — Renee Claytor
*Assistant Examiner* — Jennifer C Sawyer
(74) *Attorney, Agent, or Firm* — Hoffmann & Baron LLP

(57) ABSTRACT

The invention is directed to a process for the preparation of an aromatic acid or a phenolic compound, said process comprising reacting a dienophile and a furanic compound comprising an acetal moiety in a Diels-Alders reaction to obtain an aromatic compound comprising said acetal moiety, followed by hydrolysis and oxidation of said acetal moiety into a hydroxide or carboxylate moiety to form the aromatic acid or phenolic compound, wherein said dienophile is selected from the group consisting of alkylenes, acetylenes, acrylates, maleates, fumarates, maleimides, propiolates, acetylene dicarboxylates, and benzynes and wherein said acetal moiety is bound directly to the 2-position of the furanic compound.

23 Claims, No Drawings

PRODUCTION OF AROMATIC ACIDS AND PHENOLICS

CROSS-REFERENCE TO RELATED APPLICATIONS

This application is a U.S. National Phase application of International Application No. PCT/NL2020/050654, filed Oct. 22, 2020, which claims priority to European Patent Office application number EP 19204640.7, filed Oct. 22, 2019, the disclosures of which are incorporated herein by reference.

The present invention relates to the production of phenols or aromatic acids, especially from renewable biomass.

Aromatic compounds such as phenols and benzene carboxylic acids find many applications in the chemical industry. Benzene dicarboxylic acids, e.g. ortho-phthalic acid (also referred to herein as phthalic acid), meta-phthalic acid (also referred to herein as isophthalic acid) and para-phthalic acid (also referred to herein as terephthalic acid) and their derivatives such as their esters, are for instance used on large scale for the production of plasticizers, synthetic fibers, (plastic) bottles, in particular PET bottles, fire-retardant materials, (polyester) resins and the like. Phenols are used as raw materials and additives for industrial purposes in for instance laboratory processes, chemical industry, chemical engineering processes, wood processing, plastics processing and production of polycarbonates. Currently, commercialized processes for the preparation of phenols and benzene dicarboxylic acids typically involve the oxidation of hydrocarbons that are based on fossil fuels such as cumene (for phenol) naphthalene or ortho-xylene (for phthalic acid), m-xylene (for isophthalic acid) and p-xylene (for terephthalic acid).

It is desirable that the production processes of phenols and benzene carboxylic acids, such as respectively phenol, benzoic acid, benzene dicarboxylic acids and tricarboxylic acids such as hemimellitic and trimellitic acid/anhydride, that are currently based on using chemicals from fossil feedstocks are replaced or complemented with bio-based production processes, i.e. processes for which the required chemicals originate from a biomass feedstock. Typically, biomass that is suitable for the production of chemicals comprises one or more of the following components: oils, fats, lignin, carbohydrate polymers (e.g. starch, cellulose, hemicellulose, pectin, inulin), sucrose, sugar alcohols (e.g. erythritol).

These components can be converted into building blocks for further processing. For instance, carbohydrates can be converted into furanic compounds that may serve as a starting point for the production of phenols, benzene carboxylic acids and phthalic acids.

A current research aim is providing a process for the large-scale production of phenols or benzene carboxylic acids from renewable feedstock, in particular from lignocellulose-based materials. A first step may be breaking down biomass into lignin, cellulose and hemicellulose, followed by e.g. hydrolysis of the cellulose and dehydration of the obtained sugar to provide furanic compounds. The catalytic dehydration of in particular $C_5$ sugars generally yields furfural and catalytic dehydration of $C_6$ sugars may yield 5-hydroxymethylfurfural (also known as 5-(hydroxymethyl)-2-furaldehyde or 5-HMF) or 5-methoxymethylfurfural (also known as 5-(methoxymethyl)-2-furaldehyde or 5-MMF) or 5-chloromethylfurfural (also known as 5-(chloromethyl)-2-furaldehyde or 5-CMF). These furanic compounds can be converted into aromatic products in Diels-Alder reaction processes.

The presence of an electron-withdrawing aldehyde group deactivates the furanic compounds for Diels-Alder (DA) reactions such that harsh reaction conditions are typically required. Due to the harsh conditions and also because furfural and 5-HMF are unstable, furfural and 5-HMF tend to easily decompose or polymerize during the reaction procedure. These furanics are therefore typically unsuitable for direct application in Diels-Alder reactions. As such, furanics comprising an electron-withdrawing group are typically first converted to furanics comprising electron-neutral or electron-donating groups (e.g. by decarbonylation of furfural to furan, hydrogenation of furfural to 2-methylfuran (2-MF) and the like) such that they will be more reactive in Diels-Alders reactions and less harsh conditions are required. However, this approach is generally not desired for phenol and benzene carboxylic acid products since this brings additional reduction steps prior to, and oxidation steps after, the Diels-Alder reaction.

US 2014/350294 describes a current process to obtain terephthalic acid from 5-CMF. The process comprises the steps of reducing a furanic aldehyde (e.g. 5-chloromethylfurfural) to 2,5-dimethylfuran (2,5-DMF), followed by subjecting 2,5-DMF to a Diels-Alder reaction with a dienophile, e.g. ethene (see abstract and FIG. 1). The Diels-Alder adduct can then be converted to an aromatic compound by an in-situ ring-opening/dehydration process. Finally, oxidation of the methyl groups leads to the final aromatic acid, such as terephthalic acid. This last oxidation step of p-xylene to produce terephthalic acid is well known in the art under the name 'Amoco process' and is widely adopted in industry. The Amoco process is an aggressive process which requires expensive infrastructure. Moreover, the process described in US 2014/350294 is not atom efficient; in particular in the reduction step where a chlorine atom and an oxygen atom are lost before this oxidation state is reintroduced during the Amoco process.

The present inventors found an alternative and improved process that involves masking the aldehyde group of the furfural-type starting material with an acetal. As such, the oxidation state of the aldehyde group is not changed and no harsh oxidation process such as the Amoco process is required. The acetal can advantageously be hydrolyzed and oxidized under much milder conditions. Drawbacks of the Amoco process and the process as described in US 2014/350294 are thereby overcome.

Accordingly, the present invention is directed to a process for the preparation of an aromatic acid (i.e. a benzene carboxylic acid) or a phenolic compound, said process comprising reacting a dienophile and a furanic compound comprising an acetal moiety in a Diels-Alders reaction to obtain an aromatic compound comprising said acetal moiety, followed by hydrolysis and oxidation of said acetal moiety into a hydroxide or carboxylate moiety to form the aromatic acid or phenolic compound, wherein said dienophile is selected from the group consisting of alkylenes, acetylenes, acrylates, maleates, fumarates, maleimides, propiolates, acetylene dicarboxylates, and benzynes and wherein said acetal moiety is bound directly to the 2-position of the furanic compound.

The 2-position of the furanic compound is the carbon atom located directly adjacent to the oxygen atom in the furanic ring. An aldehyde that would be positioned here would deactivate the furanic compound in a Diels-Alder reaction as described herein-above. The present process is accordingly very suitable for processes with the furanic compound having a masked aldehyde (i.e. an acetal) at this 2-position. Formation of acetal from aldehyde is well-known in the art and can generally be carried out by reacting the aldehyde with an alcohol or diol under dehydration conditions. Suitable conditions are for example described in Greene's Protective Groups in Organic Synthesis, 4$^{th}$ edition, Wiley-Interscience and references cited therein. Also, condensation conditions as described in WO 2017/096559 are suitable.

Similarly, hydrolysis of the acetal is well-known in the art, and suitable process conditions can also be found in Greene's Protective Groups in Organic Synthesis.

Oxidation of the resulting aldehyde to an hydroxide or carboxylic acid can also be carried out using typically suitable process conditions as exemplified herein-below. For example, $Ag_2O$ or, potassium peroxymonosulfate could be used to oxidize the aldehyde into the corresponding carboxylic acid. Certain oxidation condition may result in the conversion of the aldehyde into hydroxide. For instance, oxidation of aromatic aldehydes by hydroperoxide or peracids (e.g. meta-chloroperoxybenzoic acid, or persulfuric acid) generally readily form the corresponding phenol. The Dakin oxidation is a well-known oxidation reaction of ortho- or para-hydroxylated phenyl aldehydes with hydrogen peroxide to form a benzenediol and under similar conditions, meta-hydroxylated phenyl aldehydes will lead to corresponding hydroxyphenyl carboxylic acids. (see e.g. Matsumoto et al. *J. Org. Chem.* 49, 4740-4741 (1984) and Example 24 WO2017146581).

Phenols may also be obtained from benzaldehydes via benzoic acids as intermediate compound (see e.g. Paul L. Alsters et al. Handbook of Advanced Methods and Processes in Oxidation Catalysis: From Laboratory to Industry 2014, page 408-410 and references therein).

Single-step hydrolysis and oxidation of the acetal with nitric acid may also be carried out.

Typically and preferably, the 3- and 4-positions of the furanic compound are unsubstituted. This is typical for furanic compounds originating from a biomass source such as a $C_5$-sugar. As described herein-above, it is preferred that the furanic compound is based on a biomass source. Accordingly, the furanic compound preferably has a structure according to formula I,

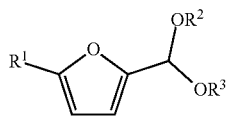

I wherein,
  $R^1$ is selected from the group consisting of H, $C_1$-$C_{20}$ alkyl, —CH(OR$^2$)(OR$^3$), $CH_2OH$ and esters and ethers thereof, $CO_2H$ and esters and amides thereof, and amides and tertiary amines of $CH_2NH_2$, and optionally polymer-supported; preferably H, methyl or $CH_2O$—($C_1$-$C_{20}$ alkyl); and
  $R^2$ and $R^3$ are independently a $C_1$-$C_{20}$ hydrocarbyl, preferably $C_1$-$C_{12}$ hydrocarbon, more preferably $C_1$-$C_8$ hydrocarbon, even more preferably benzyl or $C_1$-$C_8$ alkyl such as methyl, ethyl, propyl, 2-propyl, n-butyl, tert-butyl, pentyl, hexyl or octyl; or wherein $R^2$ and $R^3$ together form a ring and represent a $C_1$-$C_{20}$ hydrocarbylene, preferably selected from the group consisting of —(CH$_2$)$_2$—, —(CH(C$_1$-C$_{10}$ alkyl)CH$_2$—, —(CH$_2$)$_3$—, —(C(CH$_3$)$_2$)$_2$—, —(C(CH$_3$)$_2$CH$_2$C(CH$_3$)$_2$)— and 1,2-phenylene.

In a preferred embodiment of the invention, the process also comprises preparing the furanic compound comprising an acetal moiety by reacting a corresponding furfural compound with an alcohol or diol under dehydrating conditions, preferably wherein said alcohol has a structure according to $R^2OH$ and/or $R^3OH$ wherein $R^2OH$ and/or $R^3OH$ are independently a $C_1$-$C_{20}$ hydrocarbyl and said diol is selected from the group consisting of a $C_1$-$C_{20}$ hydrocarbylenediol, preferably selected from the group consisting of HO(CH$_2$)$_2$OH, HO(CH$_2$)$_3$OH, —HO(CH(C$_1$-C$_{10}$ alkyl)CH$_2$OH (i.e. a $C_3$-$C_{12}$ alkane 1,2-diol), HO(C(CH$_3$)$_2$)$_2$OH, HO(C(CH$_3$)$_2$CH$_2$C(CH$_3$)$_2$)OH and catechol. As mentioned above, the formation of an acetal from an aldehyde is well-known in the art and can generally be carried out by reacting the aldehyde with an alcohol or diol under dehydration conditions. Suitable conditions are for example described in Greene's Protective Groups in Organic Synthesis, 4$^{th}$ edition, Wiley-Interscience and references cited therein.

The dienophile in the present invention is selected from the group consisting of alkylenes, acetylenes, acrylates, maleates, fumarates, maleimides, propiolates, acetylene dicarboxylates, and benzynes. These dienophiles are generally readily available and can be well used to desirably functionalize the final product. The structure of the dienophile is preferably according to formula II,

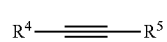

II wherein
  $R^4$ and $R^5$ are each independently selected from the group consisting of H, $C_1$-$C_8$ hydrocarbyl such a methyl, ethyl and phenyl, $CO_2Z$ wherein Z is H or an optionally halogenated $C_1$-$C_8$ hydrocarbyl such as methyl, ethyl, phenyl, 1,1,1,3,3,3-hexafluoroisopropyl or trifluoroethyl, preferably wherein one of $R^4$ and $R^5$ is H, or
  $R^4$ and $R^5$ together form a ring and represent —(CO)X(CO)—, wherein X=O, $CH_2$, NH, NMe, NEt, NPr, NBu, NPh, or S; preferably $R^4$ and $R^5$ together form a ring and represent —(CO)O(CO)—, —(CO)NMe(CO)—, —(CO)NEt(CO)— or —(CO)NPr(CO)—; and
  wherein ≡ represents a double or triple bond, preferably a double bond.

The structure of the dienophile determines to a large extent the structure of the product. Firstly, depending on whether the dienophile comprises a double or triple bond, a phenol product may be formed or not. Formation of phenolic compounds by a Diels-Alder reaction with a triple bond-containing dienophile is also described in WO 2016/114668, which publication is incorporated herein in its entirety. In the particular embodiment wherein ≡ in formula II represent a triple bond and the furanic compound has a structure of formula I, the process reaction can be illustrated according to Scheme 1. In such a process, the aromatic acid has a structure according to formula IVba and the phenolic compound has a structure according to formula IVbb or esters and ethers thereof.

Scheme 1

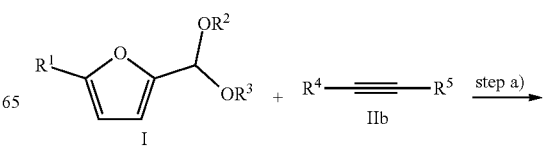

-continued

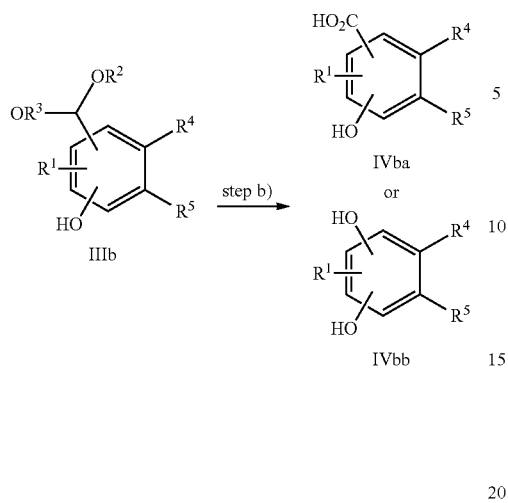

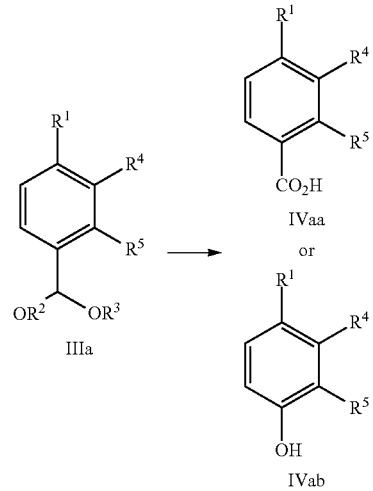

The Diels-Alder reaction of the compounds of formulae I and IIa generally results in an intermediate according to structure Va.

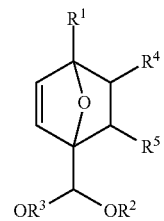

The position of the substituents OH, $R^1$ and —CHOR$^2$OR$^3$ for the aromatic compound III may differ and a mixture of various compounds can be formed having different substitution patterns of these substituents. Generally, the intermediate (herein also referred to as the Diels-Alder adduct) to this aromatic compound has a structure according to formula Vb.

The intermediate compounds according to formula Va and Vb can together be represented with formula V

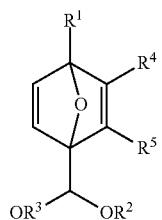

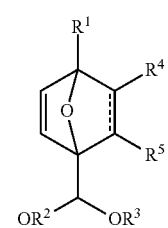

After ring-opening and aromatization of this intermediate, during which the hydroxyl, the $R^1$ and/or the —CHOR$^2$OR$^3$ can migrate, product IIIb is formed. Although —OH migration is generally observed in these processes, alkyl-migration has also been observed.

Whenever the ═══ in formula II represents a double bond and the furanic compound has a structure of formula I, the process reaction can be illustrated according to Scheme 2. In such a process, the aromatic acid has a structure according to formula IVaa and the phenolic compound has a structure according to formula IVab or esters and ethers thereof.

wherein $R^1$-$R^5$ are as defined in claims 2 and 3 and ═══ represents a double or single bond, preferably a single bond.

Diels-Alder reactions have been described previously in WO 2016/114668 (the preparation of phenolics), WO 2017/111595 (the preparation of phenolics using an yttrium-based catalyst), WO 2017/111598 (the preparation bisphenols) as well as in WO 2019/070123 (a continuous process). All of these references contain conditions that can be suitably used for the Diels-Alder reaction of the present invention, and these references are all included herein in their entirety.

The Diels-Alder reaction and subsequent conversion of intermediate Va or Vb into the aromatic compound of formula IIIa or IIIb respectively can be carried out in a single step, i.e. by an in situ ring-opening and aromatization in the same step and reactor as the Diels-Alder reaction is carried out. Alternatively, however, it is typically preferred to carry Scheme 2

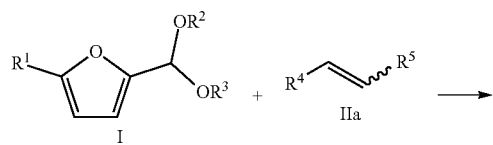

out an ex-situ ring-opening and aromatization of the intermediate Va. Particularly suitable ring-opening and aromatization conditions comprise contacting the intermediate with an acidic mixture comprising an activating agent and an acid as described in PCT/NL2019/050250, which is herein incorporated in its entirety. Preferably, the activating agent is selected from the group consisting of acylating agents, triflating agents, sulfonating agents, carbamylating agents, carbonylating agents, or combinations thereof, preferably wherein the activating agent is an acylating agent, more preferably an acylating agent selected from the group consisting of acetic anhydride, acetyl chloride, propionic anhydride, butyric anhydride, isobutyric anhydride, trimethylacetic anhydride, mixed anhydrides thereof, or combinations thereof, most preferably the activating agent comprises acetic anhydride. The acid in the acid solution if preferably sulfuric acid, but also be another, preferably anhydrous, acid or solid acid.

In a preferred embodiment $R_4$ and $R_5$ of the dienophile according to formula IIa together form a ring and represent —(CO)X(CO)—, wherein X=O, $CH_2$, NH, NMe, NEt, NPr, NBu, NPh, or S; more preferably $R^4$ and $R^5$ together form a ring and represent —(CO)O(CO)—, —(CO)NMe (CO)—, —(CO)NEt(CO)— or —(CO)NPr(CO)—. Thus, the dienophile is preferably maleic anhydride or an N-alkyl maleimide. These dienophiles react particularly well with the furanic compound according to the invention. In this preferred embodiment, as well as in the embodiment wherein $R^4$ and/or $R^5$ represents $CO_2Z$ wherein Z is not H, the $R^4$ and $R^5$ substituents of the products of formulae IVaa, IVab, IVba and IVbb (herein abbreviated as products of formula IV) may be different or may individually be the same or be different.

For instance, in case $R^4$ and $R^5$ in the aromatic compound of formula IIIa form the ring and represent —(CO)X(CO)—, this ring may be hydrolyzed in one of the steps of the invention such as the hydrolysis of the acetal such that both $R^4$ and $R^5$ will be converted into $CO_2H$. Similarly, if only one or both of $R^4$ and $R^5$ in the aromatic compound of formula IIIa or IIIb represent $CO_2Z$, wherein Z represents an optionally halogenated $C_1$-$C_8$ hydrocarbyl, $R^4$ and/or $R^5$ may represent $CO_2H$.

Furthermore, in the embodiment wherein one or both of $R^4$ and $R^5$ represent $CO_2Z$, wherein Z is a halogenated $C_1$-$C_8$ hydrocarbyl such as 1,1,1,3,3,3-hexafluoroisopropyl and trifluoroethanol, this $R^4$ and/or $R^5$ can be considered to be an activated ester and capable of forming a lactone if $R^1$ represents a $CH_2OH$, $CH_2NH_2$, $CH_2NH$-alkyl or $CH_2SH$. A similar lactonization reaction is disclosed in PCT/NL2019/050555, which is incorporated herein its entirety. In Scheme 3, this embodiment is illustrated for $R^1$ being $CH_2XH$ and $R^4$ being $CO_2Z$. The X in CH2XH may be O, NH, N-alkyl or S and is preferably O or N—($C_1$-$C_8$-alkyl).

Scheme 3

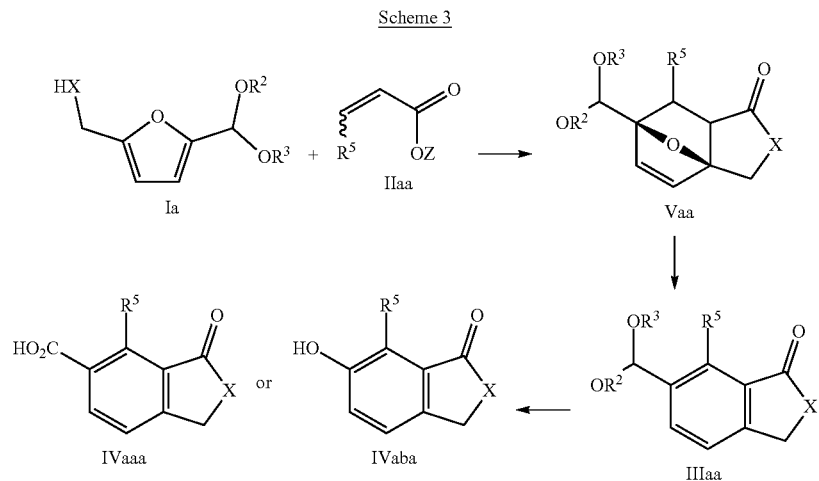

In Scheme 3, the compounds according to formulae Ia, IIaa, Vaa, IIIaa, IVaba and IVaaa are specific embodiments of the compounds described herein according to formulae I, IIa, Va, IIIa, IVab and IVaa, respectively and $R^2$, $R^3$ and $R^5$ in these formulae may correspond accordingly. It may be appreciated that the compound of formulae IIIaa, IVaaa and/or IVaba may be further hydrolyzed to open the lactone to form the compound according to formula IVaaa' or IVaba', or esters and/or ethers thereof.

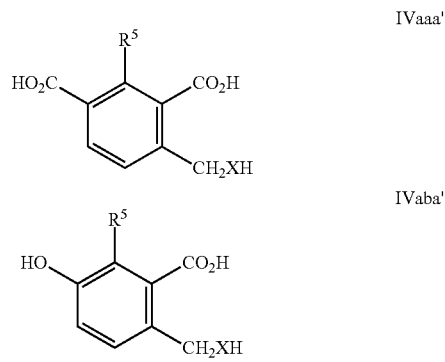

Thus, in general, any of the substituents $R^1$, $R^4$ and $R^5$ may be the same or may be different for the compounds according to formulae I, II, III and IV.

The process of the invention advantageously allows for preparing benzene dicarboxylic acids, such as phthalic acid, isophthalic acid and terephthalic acid. Meta-disubstituted benzene carboxylic acids are particularly preferred, as these are typically not well-accessible with conventional fossil-based chemistry. Also, hemi-mellitic and trimellitic acid may be obtained. Generally, for example, benzene monocarboxylic acids, such as benzoic acid, benzene dicarboxylic acids, benzene tricarboxylic acids, and benzene tetracarboxylic acids may be obtained, as well as, for example, hydroxybenzene mono di, tri, and tetra carboxylic acid, as well as esters and anhydrides thereof. In some embodiments, the benzene carboxylic acid has no other substituents than the carboxylic group and optionally the hydroxyl groups.

In addition, the method of the invention advantageously allows for preparing phenols such as phenol as well as hydroxybenzoic acids such as hydroxy tetracarboxylic acids, hydroxyl tricarboxylic acids, hydroxyl dicarboxylic acids, and hydroxyl carboxylic acids. Particularly hydroxybenzoic acids such as 4-hydroxybenzoic acid, 2-hydroxybenzoic acid, 3-hydroxybenzoic acid, 2,4-dihydroxybenzoic acid, 3,4-dihydroxybenzoic acid, 2-hydroxyterephthalic acid, 2-hydroxyisophtalic acid, 3-hydroxy-benzene-1,2,4-tricarboxylic acid, 5-hydroxy-benzene-1,2,4-tricarboxylic acid, 4-hydroxy-benzene-1,2,3-tricarboxylic acid, 5-hydroxy-benzene-1,2,3,4-tetracarboxyilic acid and 4-hydroxy-benzene-1,2,3,5-tetracarboxyilic acid are attainable by the present invention.

In a preferred embodiment, the product is phenol or benzoic acid and the dienophile is ethylene. More preferably, the compound with formula (I) is an acetal of 5-hydroxymethylfurfural, 5-methoxymethylfurfural or diacetal of 2,5-furandicarboxaldehyde. Preferably, the reaction of the dienophile with the furanic compound comprising the acetal moiety is catalyzed by a Lewis and/or Brønsted acid. Although ethylene is normally not very reactive for Diels-Alder reactions, the presence of the acetal on the furanic compound may enable the use of ethylene as dienophile with a variety of catalysts, for instance, catalysts similar to those used for the reaction of 2,5-dimethylfuran with ethylene.

The method or at least the reaction with the dienophile may be performed batch-wise or preferably in a continuous process. For a batch process, the reaction is optionally performed as a one-pot synthesis, for instance, the reaction with the compound with formula (I) and the reaction with the dienophile, by sequential addition of reagents, for example without work-up.

The hydrolysis and oxidation of the acetal group of the aromatic compound can be carried out in a single or in multiple, e.g. in two, separate steps. Said hydrolysis of the aromatic compound results in the formation and optionally isolation of an intermediate aldehyde, which intermediate aldehyde preferably has a structure according to formulae VIa or VIb, wherein $R^1$, $R^4$ and $R^5$ individually represent any of the groups as indicated for formula I and II for $R^1$, $R^4$ and $R^5$.

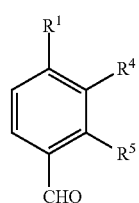

VIa

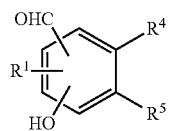

VIb

As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

For the purpose of clarity and a concise description, features are described herein as part of the same or separate embodiments, however, it will be appreciated that the scope of the invention may include embodiments having combinations of all or some of the features described.

The invention can be illustrated with the following non-limiting example.

EXAMPLE 1

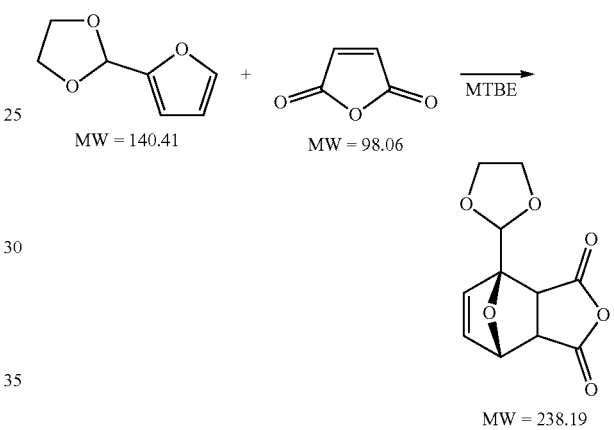

To four stirred tubes charged with maleic anhydride (1 g) and MTBE (1 ml, 2 ml, 3 ml or 4 ml) was added. The mixtures were heated to ~40° C. with stirring to achieve a solution, then ethylene glycol acetal of furfural (2-(furan-2-yl)-1,3-dioxolane, 1.461 g, 1.218 ml) was added slowly, preventing an exotherm greater than 50° C. This gave a light yellow/orange solution. This was stirred at ~40° C. for 1 hour, then allow to ~20° C. and left to stir overnight. After this time all of the mixtures had precipitated. The most concentrated reaction had stopped stirring, and the second most concentrated was stirring with difficulty, so these were broken up. The two least concentrated were stirring well. Each of the solids was then isolated by vacuum filtration (with the exception of the most concentrated as this was totally solidified, and washed with MTBE (5 ml—to rinse out the tube and wash the solid). The solids were then dried in a vacuum oven (2 mbar, 20° C.) to yield white solid products (2.277 g, 92%; 1.84 g, 74%; 1.674 g, 68% respectively for most concentrated to least concentrated). The products were combined and then analysed by NMR, which confirmed clean desired product as a mixture of 2 stereoisomers (assumed to be endo- and exo-).

EXAMPLE 2

To a 50 ml round-bottom flask was charged maleic anhydride (8.143 g), then MTBE (17.0 ml) was added. The mixture was heated to ~40° C. with stirring, to achieve a solution, then furfural ethylene glycol acetal (11.90 g, 9.917 ml) was added slowly, preventing an exotherm greater than 50° C. This was stirred at ~40° C. for ~20 minutes, then allowed to cool to ~20° C. The mixture was then seeded with a small amount of product from a previous batch, and a very fine white precipitate quickly formed. The mixture was cooled to ~0° C. (ice/water bath) with stirring, and held for a period of ~4 hours. Then the formed solids were isolated by vacuum filtration and washed with ice-cold MTBE (10 ml). The isolated solids were dried in a vacuum oven (2 mbar, 20° C.) to yield a white solid (18.53 g, 92%). The structure of the desired product was confirmed as a mixture of 2 regioisomers (assumed to be endo- and exo-) in ~1:1 ratio by NMR.

EXAMPLE 3

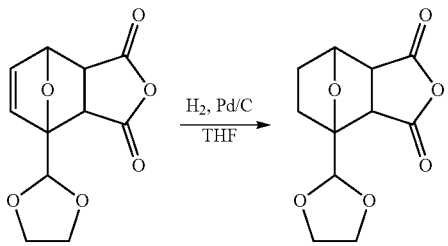 [SMILES: O=C1OC(=O)C2C1C1C=CC2(C2OCCO2)O1 ; O=C1OC(=O)C2C1C1CCC2(C2OCCO2)O1 ; "THF"]

A 100 ml autoclave reactor was charged with the Diels-Alder adduct of furfural-ethylene glycol-acetal and maleic anhydride (5 g) and 10% palladium on carbon (1 g), then THF (50 ml) was added. The reactor was quickly sealed and flushed to 15 bar 3 times with nitrogen. Then the reactor was charged to 55 bar of hydrogen. Stirring was started at 1800 rpm. During a quick exotherm to 42° C., the pressure dropped to 40 bar. The pressure was increased again to 55 bar and the mixture was stirred for 18 hours, during which time the mixture cooled to ambient. The mixture was filtered through celite, washing the cake with THF (2×25 ml). The combined filtrates were evaporated to dryness to yield a white solid (5.00 g, 99%). This was analysed by NMR and confirmed to be clean desired product.

EXAMPLE 4

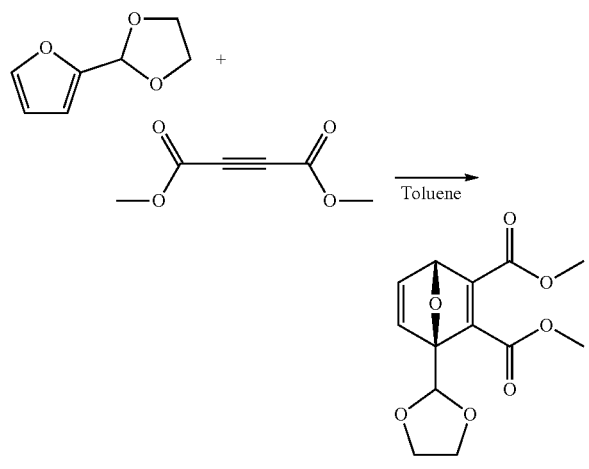

To a reactor with stirrer was charged furfural-ethylene glycol-acetal (10 g), dimethyl acetylenedicarboxylate (30.36 g) and toluene (80 ml) and the mixture was heated to 100° C. and held for 4 hours. The set-up was then re-configured for distillation and the toluene and excess dimethyl acetylenedicarboxylate were recovered by distillation. The residual liquid (19.78 g, 98%) was analysed by NMR and confirmed to be the desired Diels-Alder adduct product.

The invention claimed is:

1. A method for the preparation of an aromatic acid or a phenolic compound, said method comprising reacting a dienophile and a furanic compound comprising an acetal moiety in a Diels-Alders reaction to obtain an aromatic compound comprising said acetal moiety, followed by hydrolysis and oxidation of said acetal moiety into a hydroxide or carboxylate moiety to form the aromatic acid or phenolic compound, wherein said dienophile is selected from the group consisting of alkylenes, acetylenes, acrylates, maleates, fumarates, maleimides, propiolates, acetylene dicarboxylates, and benzynes and wherein said acetal moiety is bound directly to the 2-position of the furanic compound.

2. The method according to claim 1, wherein the furanic compound has a structure according to formula I,

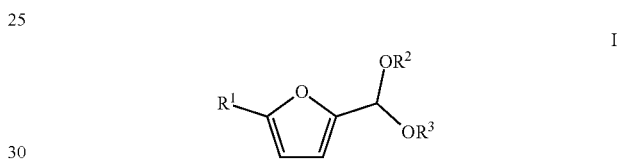

wherein,
$R^1$ is selected from the group consisting of H, $C_1$-$C_{20}$ alkyl, —CH(OR$^2$)(OR$^3$), CH$_2$OH and esters and ethers thereof, CO$_2$H and esters thereof, and amides and tertiary amines of CH$_2$NH$_2$, and optionally polymer supported; and
$R^2$ and $R^3$ are independently a $C_1$-$C_{20}$ hydrocarbyl;
or wherein $R^2$ and $R^3$ together form a ring and represent a $C_1$-$C_{20}$ hydrocarbylene.

3. The method according to claim 1, wherein the dienophile has a structure according to formula II,

wherein
$R^4$ and $R^5$ are each independently selected from the group consisting of H, $C_1$-$C_8$ hydrocarbyl CO$_2$Z wherein Z is H or an optionally halogenated $C_1$-$C_8$ hydrocarbyl or
$R^4$ and $R^5$ together form a ring and represent —(CO)X(CO)—, wherein X=O, CH$_2$, NH, NMe, NEt, NPr, NBu, NPh, or S; and
wherein ═══ represent a double or triple bond.

4. The method according to claim 1, wherein the aromatic acid has a structure according to formula IVaa and the phenolic compound has a structure according to formula IVab or esters and ethers thereof;

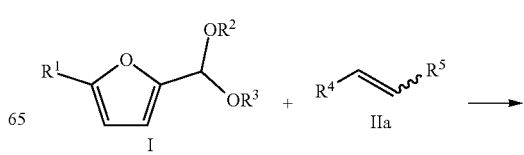

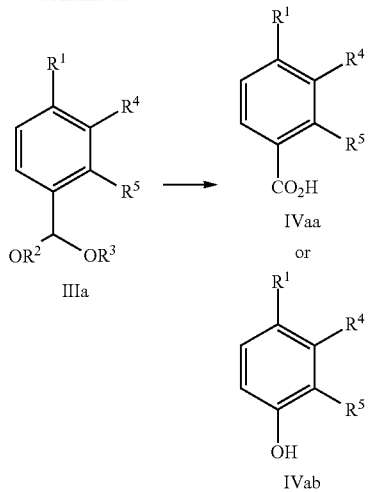

and wherein $R^1$ is selected from the group consisting of H, $C_1$-$C_{20}$ alkyl, —CH(OR$^2$)(OR$^3$), CH$_2$OH and esters and ethers thereof, CO$_2$H and esters thereof, and amides and tertiary amines of CH$_2$NH$_2$, and optionally polymer supported;

$R^2$ and $R^3$ are independently a $C_1$-$C_{20}$ hydrocarbyl; or wherein $R^2$ and $R^3$ together form a ring and represent a $C_1$-$C_{20}$ hydrocarbylene; and $R^4$ and $R^5$ are each independently selected from the group consisting of H, $C_1$-$C_8$ hydrocarbyl, CO$_2$Z wherein Z is H or an optionally halogenated $C_1$-$C_8$ hydrocarbyl or $R^4$ and $R^5$ together form a ring and represent —(CO)X(CO)—, wherein X=O, CH$_2$, NH, NMe, NEt, NPr, NBu, NPh, or S.

5. The method according to claim 1, wherein the aromatic acid has a structure according to formula IVba and the phenolic compound has a structure according to formula IVbb or esters and ethers thereof;

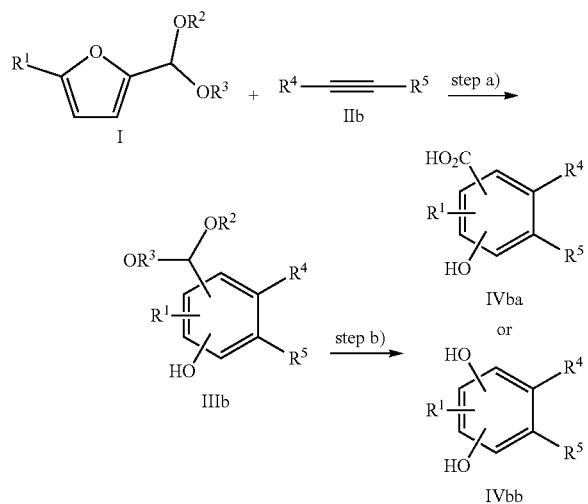

and $R^1$ is selected from the group consisting of H, $C_1$-$C_{20}$ alkyl, —CH(OR$^2$)(OR$^3$), CH$_2$OH and esters and ethers thereof, CO$_2$H and esters thereof, and amides and tertiary amines of CH$_2$NH$_2$, and optionally polymer supported;

$R^2$ and $R^3$ are independently a $C_1$-$C_{20}$ hydrocarbyl; or wherein $R^2$ and $R^3$ together form a ring and represent a $C_1$-$C_{20}$ hydrocarbylene; and $R^4$ and $R^5$ are each independently selected from the group consisting of H, $C_1$-$C_8$ hydrocarbyl, CO$_2$Z wherein Z is H or an optionally halogenated $C_1$-$C_8$ hydrocarbyl or $R^4$ and $R^5$ together form a ring and represent —(CO)X(CO)—, wherein X=O, CH$_2$, NH, NMe, NEt, NPr, NBu, NPh, or S.

6. The method according to claim 4, wherein the aromatic acid or the phenolic compound is such that $R^1$ is selected from the group consisting of H, $C_1$-$C_{20}$ alkyl, CH$_2$O— alkyl; and $R^4$ and $R^5$ are each independently H or CO$_2$H.

7. The method according to claim 1, wherein said method further comprises preparing the furanic compound comprising an acetal moiety by reacting a corresponding furfural compound with an alcohol or diol under dehydrating conditions.

8. The method according to claim 1, wherein reacting the dienophile with the furanic compound is catalyzed by a Lewis and/or Brønsted acid.

9. The method according to claim 1, wherein the hydrolysis and oxidation are carried out in two separate steps.

10. The method according to claim 1, wherein reacting the dienophile and the furanic compound in a Diels-Alders reaction to obtain the aromatic compound comprises the formation and optionally isolation of an intermediate cycloadduct according to formula V and ring-opening and aromatizing said intermediate to form said aromatic compound,

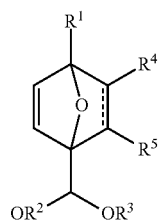

wherein $R^1$ is selected from the group consisting of H, $C_1$-$C_{20}$ alkyl, —CH(OR$^2$)(OR$^3$), CH$_2$OH and esters and ethers thereof, CO$_2$H and esters thereof, and amides and tertiary amines of CH$_2$NH$_2$, and optionally polymer supported;

$R^2$ and $R^3$ are independently a $C_1$-$C_{20}$ hydrocarbyl; or wherein $R^2$ and $R^3$ together form a ring and represent a $C_1$-$C_{20}$ hydrocarbylene; and $R^4$ and $R^5$ are each independently selected from the group consisting of H, $C_1$-$C_8$ hydrocarbyl, CO$_2$Z wherein Z is H or an optionally halogenated $C_1$-$C_8$ hydrocarbyl or $R^4$ and $R^5$ together form a ring and represent —(CO)X(CO)—, wherein X=O, CH$_2$, NH, NMe, NEt, NPr, NBu, NPh, or S; and ---- represents a double or single bond.

11. The method according to claim 1, wherein said hydrolysis of the aromatic compound results in the formation and optionally isolation of an intermediate aldehyde.

12. The method according to claim 2, wherein the furanic compound has a structure according to formula I,

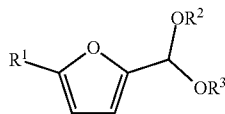

wherein,

R¹ H, methyl or CH₂O—(C₁-C₂₀ alkyl); and
R² and R³ are C₁-C₁₂ hydrocarbon.

13. The method according to claim 12, wherein R² and R³ are benzyl, methyl, ethyl, propyl, 2-propyl, n-butyl, tert-butyl, pentyl, hexyl or octyl.

14. The method according to claim 2, wherein R² and R³ together form a ring and represent a C₁-C₂₀ hydrocarbylene, selected from the group consisting of —(CH₂)₂—, —(CH(C₁-C₁₀ alkyl)CH₂—, —(CH₂)₃—, —(C(CH₃)₂)₂—, —(C(CH₃)₂CH₂C(CH₃)₂)— and 1,2-phenylene.

15. The method according to claim 3, wherein one of R⁴ and R⁵ is H.

16. The method according to claim 3, wherein R⁴ and R⁵ together form a ring and represent (CO)O(CO)—, —(CO)NMe(CO)—, —(CO)NEt(CO)— or —(CO)NPr(CO)—.

17. The method according to claim 3, wherein ⚌ represents a double bond.

18. The method according to claim 6, wherein R¹ is H, methyl or CH₂O—(C₁-C₂₀ alkyl).

19. The method according to claim 7, wherein said alcohol has a structure according to R²OH and/or R³OH wherein R²OH and/or R³OH are independently a C₁-C₂₀ hydrocarbyl and said diol is selected from the group consisting of a C₁-C₂₀ hydrocarbylenediol.

20. The method according to claim 19, wherein said alcohol is selected from the group consisting of HO(CH₂)₂OH, HO(CH₂)₃OH, HO(CH(C₁-C₁₀ alkyl)CH₂OH, HO(C(CH₃)₂)₂OH, HO(C(CH₃)₂CH₂C(CH₃)₂)OH and catechol.

21. The method according to claim 10, wherein ⚌ represents single bond.

22. The method according to claim 11, wherein said intermediate aldehyde has a structure according to formulae VIa or VIb,

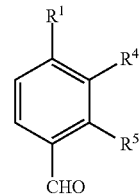

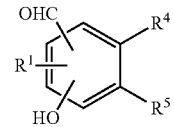

wherein R¹ is selected from the group consisting of H, C₁-C₂₀ alkyl, —CH(OR²)(OR³), CH₂OH and esters and ethers thereof, CO₂H and esters thereof, and amides and tertiary amines of CH₂NH₂, and optionally polymer supported; and R⁴ and R⁵ are each independently selected from the group consisting of H, C₁-C₈ hydrocarbyl, CO₂Z wherein Z is H or an optionally halogenated C₁-C₈ hydrocarbyl or R⁴ and R⁵ together form a ring and represent —(CO)X(CO)—, wherein X=O, CH₂, NH, NMe, NEt, NPr, NBu, NPh, or S.

23. The method according to claim 3, wherein C₁-C₈ hydrocarbyl is methyl, ethyl or phenyl; and halogenated C₁-C₈ hydrocarbyl is methyl, ethyl, phenyl, 1,1,1,3,3,3-hexafluoroisopropyl or trifluoroethyl.

* * * * *